United States Patent Office 2,733,265
Patented Jan. 31, 1956

2,733,265
PREPARATION OF CARBOCYCLIC TRICYCLIC KETO-ACIDS

Martin W. Farrar, Webster Groves, and Harold Raffelson, St. Louis, Mo., assignors to Monsanto Chemical Company, St. Louis, Mo., a corporation of Delaware No Drawing. Application May 25, 1953, Serial No. 357,380

9 Claims. (Cl. 260—514)

This invention relates to the preparation of carbocyclic tricyclic keto-acids having the 1-(beta-carboxy-ethyl)-8a-methyl-$\Delta^{10}$-decahydrophenanthren-2-one nucleus

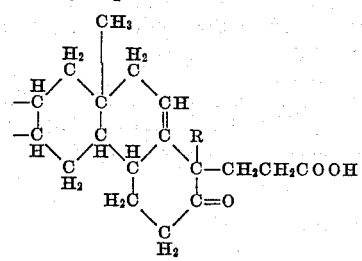

where R is hydrogen or a methyl radical, which keto-acids are useful intermediates in synthesis of steroids. Such keto-acids have been synthesized from carbocyclic tricyclic ketones having the 3-(N-methylanilino) methylene-8a-methyl-$\Delta^{10a(1)}$-decahydrophenanthren-2-one nucleus

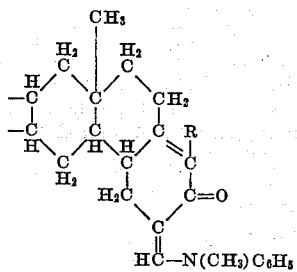

where R is hydrogen or a methyl radical by condensation with acrylonitrile in an inert atmosphere and in the presence of a quaternary ammonium hydroxide followed by converting the cyanoethylated product so obtained by vigorous basic hydrolysis in an inert atmosphere to the corresponding keto-acid. While the yields have been somewhat satisfactory from the standpoint of laboratory scale operations, the process has many serious drawbacks from the standpoint of large scale manufacture.

In accordance with this invention it has been found that carbocyclic tricyclic keto-acids having the aforedescribed 1-(beta-carboxyethyl)8 a-methyl-$\Delta^{10}$-deca-hydrophenanthren-2-one nucleus can be conveniently prepared in excellent yields from the corresponding carbocyclic tricyclic ketone having the aforedescribed 3-(N-methylanilino) methylene-8a-methyl-$\Delta^{10a(1)}$-deca-hydrophenanthren-2-one nucleus by reacting the latter with beta-propiolactone in a basic medium. Any strong base can be utilized in the process of this invention, for example an alkali metal hydroxide, such as sodium hydroxide, potassium hydroxide, and the like, a quaternary ammonium hydroxide such as benzyl trimethyl ammonium hydroxide, choline, and the like, an alkali metal amide such as sodamide, potassium amide, lithium amide, lithium dimethyl amide, an alkali metal triphenyl methide such as sodium triphenyl methide or a metal-organic base such as an alkali metal alcoholate, and the like. The preferred bases are the alkali metal amides of the structural formula M—N(A)₂ where M is an alkali metal, i. e. sodium, potassium, lithium, etc., and where A is hydrogen or a short chain alkyl radical such as methyl, ethyl, propyl or butyl. The proportion of base utilized will vary but will be present in an amount sufficient to cause the reaction to proceed normally. Ordinarily the amount of base employed will vary in the range from one chemical equivalent to four or more chemical equivalents based on the carbocyclic tricyclic ketone reactant.

The process of this invention essentially comprises intimately mixing the carbocyclic tricyclic ketone reactant, examples of which being 3 - (N - methylanilino) methylene - 8a - methyl - $\Delta^{6,10a(1)}$ - decahydrophenanthren - 2 - one
3 - (N - methylanilino) methylene - 8a - methyl - $\Delta^{10a(1)}$ - dodecahydrophenanthren - 2 - one
3 - (N - methylanilino) methylene - 6,7 - dihydroxy - 8a - methyl - $\Delta^{10a(1)}$ - dodecahydrophenanthren - 2 - one
3 - (N - methylanilino) methylene - 6,7 - dihydroxy - 8a - methyl - $\Delta^{10a(1)}$ - dodecahydrophenanthren - 2 - one acetonide
3 - (N - methylanilino) methylene - 6,7 - dihydroxy - 8a - methyl - $\Delta^{10a(1)}$ - dodecahydrophenanthren - 2 - one cyclohexanonide
3 - (N - methylanilino) methylene - 6,7 - dihydroxy - 8a - methyl - $\Delta^{10a(1)}$ - dodecahydrophenanthren - 2 - one diethyl ketonide
1,8a - dimethyl - 3 - (N - methylanilino) methylene - $\Delta^{6,10a(1)}$ - decahydrophenanthren - 2 - one
1,8a - dimethyl - 3 - (N - methylanilino) methylene - $\Delta^{10a(1)}$ - dodecahydrophenanthren - 2 - one
1,8a - dimethyl - 3 - (N - methylanilino) methylene - 6,7 - dihydroxy - $\Delta^{10a(1)}$ - dodecahydrophenanthren - 2 - one
1,8a - dimethyl - 3 - (N - methylanilino) methylene - 6,7 - dihydroxy - $\Delta^{10a(1)}$ - dodecahydrophenanthren - 2 - one acetonide
1,8a - dimethyl - 3 - (N - methylanilino) methylene - 6,7 - dihydroxy - $\Delta^{10a(1)}$ - dodecahydrophenanthren - 2 - one cyclohexanonide
1,8a - dimethyl - 3 - (N - methylanilino) methylene - 6,7 - dihydroxy - $\Delta^{10a(1)}$ - dodecahydrophenanthren - 2 - one diethyl ketonide with beta-propiolactone in a basic medium to effect the reaction and isolating the resultant keto-acid. Since, via this reaction, a new asymmetric center is introduced the resultant keto-acid is a mixture of stereoisomers, which isomers are commonly referred to as α- and β-isomers. These stereoisomers, where necessary or desirable, are separable from one another by crystallization from a suitable inert solvent.

As illustrative of the process of this invention is the following:

Example I

To an intimately mixed mixture containing approximately 100 parts by weight of 1,8a - dimethyl - 3 - (N - methylanilino) methylene - 6,7 - dihydroxy - $\Delta^{10a(1)}$ - dodecahydrophenanthren - 2 - one acetonide (M. P. about 219–222° C.), approximately 19 parts by weight of freshly prepared lithium dimethyl amide and 580 parts by weight of diethyl ether is added at a temperature of about 5° C. with agitation a solution containing approximately 95 parts by weight of beta-propiolactone in 350 parts by weight of diethyl ether over a period of about one hour. The mix so obtained is then agitated at 0–5° C. for about one hour and thereafter approximately 500 parts by weight of water is added and intimately mixed therein. The aqueous and organic layers are separated, the organic layer being discarded. The aqueous layer is then admixed with sufficient potassium hydroxide to raise the pH to about 10. Thereupon the mix is refluxed for about 5 hours. Upon cooling, the mass is admixed with an equal volume of diethyl ether. The ether layer and the aqueous layer are separated, the latter being then acidified with dilute hydrochloric acid and then extracted with diethyl ether. The original ether layer and the ether extracts are combined, washed with water and then subjected to vacuum distillation. An oily residue assaying substantially 100% 1,8a - dimethyl - 1 - (β - carboxy - ethyl) - 6,7 - dihydroxy - $\Delta^{10}$ - dodecahydrophenanthren - 2 - one acetonide is obtain which residue is a mixture of the α- and β-isomers of the keto-acid in a weight ratio of approximately 3:1.

*Example II*

To an intimately mixed mixture containing approximately 10 parts by weight (substantially 0.0288 mols) of dl - anti - trans - 1,8a - dimethyl - 3 - (N - methylanilino)methylene - $\Delta^{6,10a(1)}$ - decahydrophenanthren - 2 - one, approximately 2.26 parts by weight (substantially 0.041 mol) of freshly prepared potassium amide and approximately 106 parts by weight of diethyl ether is added at a temperature of about 0° C. with agitation a solution containing approximately 11.5 parts by weight (substantially 0.16 mol) of β-propiolactone dissolved in approximately 36 parts by weight of diethyl ether over a period of about 30 minutes. The mix is then agitated at 0° C. for about 30 minutes and thereafter approximately 4 parts by weight of methanol and approximately 75 parts by weight of water is intimately mixed therein. The organic and aqueous layers are separated. The aqueous layer is then acidified with dilute hydrochloric acid. The acidified mix is admixed with an equal volume of diethyl ether and agitated for about 3 hours. The ether layer is removed, washed with water and evaporated to dryness. The product so obtained is admixed with approximately 60 parts by weight of a 15% aqueous solution of potassium hydroxide and refluxed for about 5 hours. The mix is then cooled and admixed with an equal volume of diethyl ether. The ether layer and the aqueous layers are separated, the latter being then acidified and extracted with diethyl ether. The original ether layer and ether extracts are combined, washed with water and evaporated to dryness. The oily product so obtained is a mixture of the α- and β-isomers of dl-anti-trans-1,8a-dimethyl-1-(β-carboxyethyl), $\Delta^{6,10}$-decahydrophenanthren-2-one.

The oily product of Example II is taken up in warm ether whereupon cooling the β-isomer crystallizes therefrom as a white solid, the α-isomer remaining in solution. Upon recovering the α-isomer the weight ratio of α- to β-isomer is found to be approximately 3:1.

*Example III*

Employing the same procedure as in Example II but replacing dl-anti-trans-1,8a-dimethyl-3-(N-methylanilino) methylene, $\Delta^{6,10a(1)}$-decahydrophenanthren-2-one with an equimolar amount of l-anti-trans-1,8a-dimethyl-3-(N-methylanilino) methylene, $\Delta^{6,10a(1)}$-decahydrophenanthren-2-one there is obtained an excellent yield of an oily product containing the isomeric mixture of the α- and β-isomers of l-anti-trans-1,8a-dimethyl-1-(β-carboxyethyl), $\Delta^{6,10}$-decahydrophenanthren-2-one. The weight ratio of α- to β-isomer in the mixture is found to be approximately 3:1.

*Example IV*

Employing the same procedure as in Example II but replacing dl-anti-trans-1,8a-dimethyl-3-(N-methylanilino) methylene, $\Delta^{6,10a(1)}$-decahydrophenanthren-2-one with an equimolar amount of d-anti-trans-1,8a-dimethyl-3-(N-methylanilino) methylene, $\Delta^{6,10a(1)}$-decahydrophenanthren-2-one there is obtained an excellent yield of an oily product containing the isomeric mixture of the α- and β-isomers of d-anti-trans-1,8a-dimethyl-1-(β-carboxyethyl), $\Delta^{6,10}$-decahydrophenanthren-2-one. The weight ratio of α- to β-isomer in the mixture is found to be approximately 3:1.

In the process of this invention the molar ratio of beta-propiolactone to the carbocyclic tricyclic ketone reactant will ordinarily be in excess of one to one. In general, however, a molar ratio of beta-propiolactone to the carbocyclic tricyclic ketone reactant of about 3–10:2 will be employed.

Other inert solvents than diethyl ether may be employed, e. g., benzene, toluene, xylene, solvent naphtha, diisopropyl ether, methyl-butyl ether, tetrahydrofuran, and the like.

While the operating temperatures of the process of this invention may vary widely as for example from −30° C. to the refluxing temperature of the system, it is preferred that the reaction be conducted in the range of from about 0° C. to about 30° C.

Although the invention has been described with respect to certain embodiments it is not so limited and it is to be understood that variations and modifications thereof obvious to those skilled in the art may be made without departing from the spirit or scope of this invention.

What is claimed is:

1. The process of preparing a carbocyclic tricyclic keto-acid having the 1-(beta-carboxyethyl)-8a-methyl-$\Delta^{10}$-decahydrophenanthren-2-one nucleus

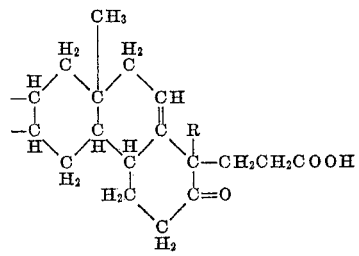

where R is selected from the group consisting of hydrogen and the methyl radical, from a carbocyclic tricyclic ketone having the 3-(N-methylanilino) methylene-8a-methyl-$\Delta^{10a(1)}$-decahydrophenanthren-2-one nucleus

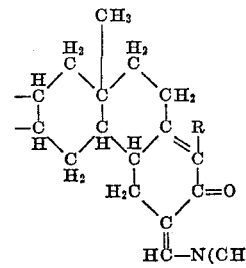

where R is selected from the group consisting of hydrogen and the methyl radical, which comprises reacting said carbocyclic tricyclic ketone with at least an equimolecular proportion of beta-propiolactone in the presence of a strong base.

2. The process of preparing a carbocyclic tricyclic keto-acid having the 1-(beta-carboxyethyl)-8a-methyl-$\Delta^{10}$-decahydrophenanthren-2-one nucleus

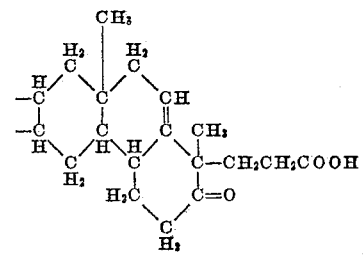

from a carbocyclic tricycle ketone having the 3-(N- methylanilino) methylene-8a-methyl-Δ10a(1)-decahydrophenanthren-2-one nucleus

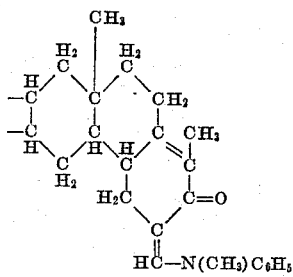

which comprises reacting said carbocyclic tricyclic ketone with at least an equimolecular proportion of beta-propiolactone in a basic medium containing approximately one to four chemical equivalents of a strong base based upon the carbocyclic tricyclic ketone reactant.

3. The process of preparing a carbocyclic tricyclic keto-acid having the 1-(beta-carboxyethyl)-8a-methyl-Δ10-decahydrophenanthren-2-one nucleus

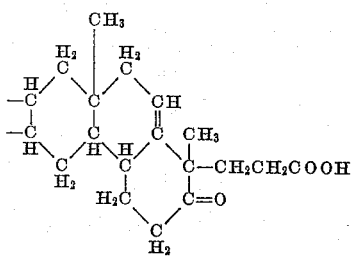

from a carbocyclic tricyclic ketone having the 3-(N-methylanilino) methylene-8a-methyl-Δ10a(1)-decahydrophenanthren-2-one nucleus

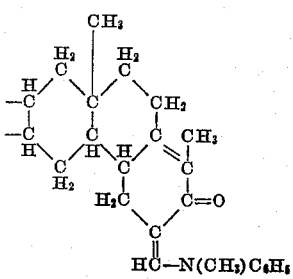

which comprises reacting said carbocyclic tricyclic ketone with at least an equimolecular proportion of beta-propiolactone in a basic medium containing approximately one to four chemical equivalents based on the carbocyclic tricyclic ketone reactant of an alkali metal amide of the formula M—N(A)$_2$ where M is an alkali metal and where A is selected from the group consisting of hydrogen and short chain alkyl radicals.

4. The process of preparing 1,8a-dimethyl-1-(beta-carboxyethyl)-Δ6,10-decahydrophenanthren-2-one which comprises reacting at least one molecular proportion of beta-propiolactone with substantially one molecular proportion of 1,8a-dimethyl-3-(N-methylanilino) methylene-Δ6,10a(1)-decahydrophenanthren-2-one in a liquid medium containing approximately one to four chemical equivalents of a strong base based on the carbocyclic tricyclic ketone reactant.

5. The process of preparing 1,8a-dimethyl-1-(beta-carboxyethyl)-Δ6,10-decahydrophenanthren-2-one which comprises reacting 3 to 10 molecular proportions of beta-propiolactone with substantially two molecular proportions of 1,8a-dimethyl-3-(N-methylanilino) methylene-Δ6,10a(1)-decahydrophenanthren-2-one in a liquid medium containing approximately one to four chemical equivalents of an alkali metal amide based on the carbocyclic tricyclic ketone reactant.

6. The process of preparing 1,8a-dimethyl-1-(beta-carboxyethyl)-Δ6,10-decahydrophenanthren-2-one which comprises reacting 3 to 10 molecular proportions of beta-propiolactone with substantially two molecular proportions of 1,8a-dimethyl-3-(N-methylanilino) methylene-Δ6,10a(1)-decahydrophenanthren-2-one in a liquid medium containing approximately one to four chemical equivalents of potassium amide based on the carbocyclic tricyclic ketone reactant.

7. The process of claim 4 wherein the carbocyclic tricyclic ketone reactant is an anti-trans isomer.

8. The process of claim 6 wherein the carbocyclic tricyclic reactant is the *l*-anti-trans isomer.

9. The process of claim 6 wherein the carbocyclic tricyclic reactant is the *d*-anti-trans isomer.

References Cited in the file of this patent

Woodward et al.: J. A. C. S. 74, pp. 4223–4251 (1952).